(12) United States Patent
Futaki et al.

(10) Patent No.: US 12,022,330 B2
(45) Date of Patent: Jun. 25, 2024

(54) DISTRIBUTED UNIT, CENTRAL UNIT, AND METHOD FOR ADDITION OF ACTIVATED OR DORMANT SECONDARY CELL

(71) Applicant: NEC Corporation, Tokyo (JP)

(72) Inventors: Hisashi Futaki, Tokyo (JP); Sadafuku Hayashi, Tokyo (JP)

(73) Assignee: NEC Corporation (JP)

( * ) Notice: Subject to any disclaimer, the term of this patent is extended or adjusted under 35 U.S.C. 154(b) by 244 days.

(21) Appl. No.: 17/288,200

(22) PCT Filed: Aug. 23, 2019

(86) PCT No.: PCT/JP2019/033169
§ 371 (c)(1),
(2) Date: Apr. 23, 2021

(87) PCT Pub. No.: WO2020/090201
PCT Pub. Date: May 7, 2020

(65) Prior Publication Data
US 2021/0410021 A1 Dec. 30, 2021

(30) Foreign Application Priority Data
Nov. 2, 2018 (JP) .................................. 2018-207415

(51) Int. Cl.
*H04W 36/00* (2009.01)
*H04W 36/12* (2009.01)
*H04W 92/24* (2009.01)

(52) U.S. Cl.
CPC ....... *H04W 36/0033* (2013.01); *H04W 36/12* (2013.01); *H04W 92/24* (2013.01)

(58) Field of Classification Search
CPC . H04W 76/27; H04W 36/08; H04W 36/0033; H04W 36/12; H04W 92/24
See application file for complete search history.

(56) References Cited

U.S. PATENT DOCUMENTS

| 11,297,674 B2 * | 4/2022 | He .................... H04W 76/28 |
| 2015/0029913 A1 | 1/2015 | Zhou et al. |
| 2019/0190682 A1 * | 6/2019 | Kadiri ............... H04W 72/0453 |

(Continued)

FOREIGN PATENT DOCUMENTS

| CN | 104067553 A | 9/2014 |
| CN | 107770795 A | 3/2018 |

(Continued)

OTHER PUBLICATIONS

JP Office Action for JP Application No. 2020-554781, mailed on Jun. 28, 2022 with English Translation.

(Continued)

*Primary Examiner* — Allahyar Kasraian
(74) *Attorney, Agent, or Firm* — NEC-IPC

(57) ABSTRACT

A central unit (1) of a base station sends, to a distributed unit (2) of the base station, a message requesting addition of a secondary cell for carrier aggregation. The message contains a first information element indicating that the secondary cell needs to be initially activated or dormant. It is thus, for example, possible to contribute to improvement for enabling direct configuration of a secondary cell state in an architecture where a base station divides into a central unit and a distributed unit.

13 Claims, 12 Drawing Sheets

(56) References Cited

U.S. PATENT DOCUMENTS

| | | | |
|---|---|---|---|
| 2019/0387561 A1 | 12/2019 | Paladugu et al. | |
| 2020/0351971 A1* | 11/2020 | Fiorani | H04B 17/318 |
| 2020/0383164 A1 | 12/2020 | Kim et al. | |
| 2020/0396740 A1* | 12/2020 | Toeda | H04W 56/001 |
| 2021/0243656 A1* | 8/2021 | Paterson | H04W 36/0033 |
| 2022/0201777 A1* | 6/2022 | Teyeb | H04L 45/302 |

FOREIGN PATENT DOCUMENTS

| | | |
|---|---|---|
| WO | 2018/174489 A1 | 9/2018 |
| WO | 2019/241621 A1 | 12/2019 |

OTHER PUBLICATIONS

ZTE, "WF on SCell management over F1", 3GPP TSG RAN WG3#99 Meeting Athens, Greece, Feb. 26-Mar. 2, 2018, R3-181395, pp. 1-2.

NEC, "DU Configuration Query", 3GPP TSG-RAN3-AH-1807 Montreal, Canada, Jul. 2-6, 2018, R3-183921, pp. 1-2.

ZTE, "(TP for NR BL CR for TS38.473) RLC reestablishment for Solution2a", 3GPP TSG-RAN WG3 #101 Gothenburg, Sweden, Aug. 20-24, 2018, R3-185299, pp. 1-11.

Extended European Search Report for EP Application No. 19878036.3 dated on Nov. 16, 2021.

Huawei, "Further discussions on UE context management related with EN-DC operation", 3GPP Draft; 3GPP TSG-RAN WG3 NR Ad-Hoc#1801, R3-180353 (R3-170353), Jan. 13, 2018.

Indian Office Action for IN Application No. 202117019338 mailed on Feb. 11, 2022.

International Search Report for PCT Application No. PCT/JP2019/033169, mailed on Oct. 29, 2019.

Nokia, Nokia Shanghai Bell, "Stage-2 description of euCA", 3GPP R2-1809245, 3GPP TSG-RAN WG2 Meeting #102, Busan, South Korea, May 21-25, 2018.

Nokia, Nokia Shanghai Bell, "UE capability definitions for euCA", 3GPP R2-1809246, 3GPP TSG-RAN WG2 Meeting #102, Busan, South Korea, May 21-25, 2018.

Nokia, Nokia Shanghai Bell, "MAC functionality for euCA", 3GPP R2-1809269, 3GPP TSG-RAN WG2 Meeting #102, Busan, Republic of Korea, May 21-25, 2018.

Nokia, Nokia Shanghai Bell, "Signalling for euCA (Enhancing LTE CA Utilization)", 3GPP RP-182006, 3GPP TSG RAN Meeting #81, Gold Coast, Australia, Sep. 10-13, 2018.

CATT, "Consideration on UE context management procedures for EN-DC", 3GPP R3-180513, 3GPP TSG RAN WG3 NR Adhoc 1801, Sophia Antipolis, France, Jan. 22-26, 2018, pp. 1-3.

Nokia, Nokia Shanghai Bell, "Signalling for euCA", 3GPP R2-1813154, 3GPP TSG-WG2 Meeting #103, Gothenburg Sweden, Aug. 20-24, 2018.

Ericsson, "Extension of overheating indication parameters", 3GPP R2-1817930, 3GPP TSG-RAN WG2 #104, Spokane, USA, Nov. 12-16, 2018, pp. 1-2.

Samsung, KT, "User inactivity monitoring in CU-DU architecture", 3GPP R3-181193, 3GPP TSG-RAN WG3 #99. Athens, Greece, Feb. 26-Mar. 2, 2018.

Nokia, Nokia Shanghai Bell, "Clarifications to BWP common to EN-DC and SA", 3GPP R2-1810031, 3GPP TSG-RAN WG2 Meeting NR Adhoc 1807, Montreal, Canada, Jul. 2-6, 2018.

Nokia et al., "(TP for NSA BL CR for TS 38.473) User inactivity monitoring", 3GPP R3-182913, 3GPP TSG-RAN WG3 #100, Busan, South Korea, May 21-25, 2018.

3rd Generation Partnership Project, "Technical Specification Group Radio Access Network; NG-RAN; F1 application protocol (F1AP) (Release 15)", 3GPP TS 38.473 V15.3.0, Sep. 2018, pp. 1-176.

3rd Generation Partnership Project, "Technical Specification Group Radio Access Network; NR; Radio Resource Control (RRC) protocol specification (Release 15)", 3GPP TS 38.331 V15.3.0, Sep. 2018, pp. 1-445.

3rd Generation Partnership Project, "Technical Specification Group Radio Access Network; Evolved Universal Terrestrial Radio Access (E-UTRA); Radio Resource Control (RRC) protocol specification (Release 15)", 3GPP TS 36.331 V15.3.0, Sep. 2018, pp. 1-918.

3rd Generation Partnership Project, "Technical Specification Group Radio Access Network; NG-RAN; Architecture description (Release 15)", 3GPP TS 38.401 V15.3.0, Sep. 2018, pp. 1-39.

Ericsson, "Response to R3-181213", 3GPP R3-181371, 3GPP TSG-RAN WG3 #99 meeting, Athens, Greece, Feb. 26-Mar. 2, 2018.

Nokia (rapporteur), "Summary of WI on Enhancing LTE CA utilization", 3GPP RP-181596, 3GPP TSG RAN Meeting #81, Gold Coast, Australia, Sep. 10-13, 2018, pp. 1-2.

CN Office Action for Chinese Patent Application No. 201980073139.X, mailed on Jan. 10, 2024 with English Translation.

* cited by examiner

UE CONTEXT SETUP REQUEST

| IE / Groupe Name | Presence | Range | IE Type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| ... | | | | | | |
| SCell To Be Setup List | | 0..1 | | | YES | ignore |
| >SCell to Be Setup Item IEs | | 1..<maxnoof SCells> | | | EACH | ignore |
| >>SCell ID | M | | NR CGI 9.3.1.12 | SCell Identifier in gNB | | |
| >>SCellIndex | M | | INTEGER (1..31) | | | |
| ... | | | | | | |
| >>SCell State | O | | ENUMERATED (activated, dormant, ...) | Initial SCell state | | |
| ... | | | | | | |

Fig. 4

UE CONTEXT SETUP REQUEST

| IE / Groupe Name | Presence | Range | IE Type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| ...... | | | | | | |
| SCell To Be Setup List | | 0..1 | | | YES | ignore |
| >SCell to Be Setup Item IEs | | 1..<maxnoof SCells> | | | EACH | ignore |
| >>SCell ID | M | | NR CGI 9.3.1.12 | SCell Identifier in gNB | | |
| >>SCellIndex | M | | INTEGER (1..31) | | | |
| ...... | | | | | | |
| >>Inactivity Monitoring Request | O | | ENUMERATED (true, ...) | | YES | reject |
| ...... | | | | | | |

Fig. 11

UE CONTEXT MODIFICATION REQUEST

| IE / Groupe Name | Presence | Range | IE Type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| ... | | | | | | |
| SCell To Be Setup List | | 0..1 | | | YES | ignore |
| >SCell to Be Setup Item IEs | | 1..<maxnoof SCells> | | | EACH | ignore |
| >>SCell ID | M | | NR CGI 9.3.1.12 | SCell Identifier in gNB | | |
| >>SCellIndex | M | | INTEGER (1..31) | | | |
| ... | | | | | | |
| >>Inactivity Monitoring Request | O | | ENUMERATED (true, ...) | | YES | reject |
| ... | | | | | | |

Fig. 12

UE INACTIVITY NOTIFICATION

| IE / Groupe Name | Presence | Range | IE Type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| | | | | | | |
| SCell Activity List | | 1 | | | YES | reject |
| >SCell Activity Item | | 1..<maxnoof SCells> | | | EACH | reject |
| >>SCell ID | M | | NR CGI 9.3.1.12 | SCell Identifier in gNB | -- | -- |
| >>SCellIndex | M | | INTEGER (1..31) | | -- | -- |
| >>SCell Activity | M | | ENUMERATED (Active, Not Active, ...) | | -- | -- |

Fig. 13

DISTRIBUTED UNIT, CENTRAL UNIT, AND METHOD FOR ADDITION OF ACTIVATED OR DORMANT SECONDARY CELL

This application is a National Stage Entry of PCT/JP2019/033169 filed on Aug. 23, 2019, which claims priority from Japanese Patent Application 2018-207415 filed on Nov. 2, 2018, the contents of all of which are incorporated herein by reference, in their entirety.

TECHNICAL FIELD

The present disclosure relates to a radio communication system and, in particular, enhancements to carrier aggregation.

BACKGROUND ART

The 3rd Generation Partnership Project (3GPP) Release 15 will introduce enhancements to carrier aggregation (CA). These enhancements intend to fast (or quick) setup and activation of a Secondary Cell (SCell) (see Non-Patent Literature 1-4).

One of these enhancements is introduction of a new SCell state called "dormant state". When the SCell is in dormant state, a radio terminal (i.e., User Equipment (UE)) measures and reports Channel State Information (CSI), but it does not decode Physical Downlink Control Channel (PDCCH). That is, dormant SCell state (or an SCell in dormant state) differs from activated SCell state (or an SCell in activated state) at least in that the UE does not monitor or decode PDCCH. In addition, dormant SCell state differs from deactivated SCell state (or an SCell in deactivated state) at least in that the UE measures and reports CSI.

Another one of the enhancements is direct SCell state configuration via Radio Resource Control (RRC). In the existing CA, when an SCell is added, the SCell is initially deactivated. In contrast to this, direct SCell state configuration allows an SCell to be initially activated or dormant via RRC during SCell addition or handover. When the eNB configures an SCell, it can set the initial state of the SCell to "activated" or "dormant".

Besides, as well kwon, the 3GPP has been working on the standardization for the fifth generation mobile communication system (5G) to make 5G a commercial reality in 2020 or later. In this specification, the fifth generation mobile communication system is referred to as 5G System or Next Generation (NextGen) System (NG System). The new Radio Access Technology (RAT) for the 5G System is referred to as New Radio, NR, 5G RAT, or NG RAT. A new Radio Access Network (RAN) for the 5G System is referred to as NextGen RAN, NG RAN, or 5G-RAN. A new base station in the NG-RAN is referred to as gNodeB or gNB. A new core network for the 5G System is referred to as 5G Core Network (5GC) or NextGen Core (NG Core). A radio terminal (i.e., User Equipment (UE)) capable of being connected to the 5G System is referred to as 5G UE or NextGen UE (NG UE), or simply referred to as UE.

The main components of the 5GC includes an Access and Mobility Management function (AMF), a Session Management function (SMF), and a User plane function (UPF). The AMF performs, for example, connection and mobility managements for UEs and provides a termination of a control plane (CP) of the NG-RAN (e.g., exchange of CP information with NG-RAN nodes), and termination of a NAS layer (e.g., exchange of NAS messages with UEs). The SMF performs, for example, a session management (SM) and provides a termination of the session management part of NAS massages. The UPF is an anchor point of Intra-RAT and Inter-RAT mobility (e.g., handover) and performs, for example, a management of QoS flows (e.g., DL reflective QoS marking).

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). For example, an eLTE eNB functioning as a NG-RAN node is referred to as ng-eNB. Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

The NR supports use of different sets of radio parameters in multiple frequency bands. Each radio parameter set is referred to as "numerology". Orthogonal Frequency Division Multiplexing (OFDM) numerology for an OFDM system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on service requirements.

The NR supports channel bandwidths wider than those of the LTE (e.g., 100s of MHz). One channel bandwidth (i.e., a BW_Channel) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 800 MHz.

In order to effectively support multiple 5G services, such as wideband services like eMBB and narrow-bandwidth services like Internet of Things (IoT), it is preferable to multiplex these services onto a single channel bandwidth. Further, if every 5G UE needs to support transmission and reception in a transmission bandwidth corresponding to the entire channel bandwidth, this may hinder achievement of lower cost and lower power consumption of UEs for narrow-bandwidth IoT services. Thus, the 3GPP allows one or more bandwidth parts (BWPs) to be configured in the carrier bandwidth (i.e., channel bandwidth or system bandwidth) of each NR component carrier. The bandwidth part is also referred to as carrier bandwidth part. Multiple BWPs may be used for frequency division multiplexing (FDM) schemes using different numerologies (e.g., subcarrier spacing (SCS)). For example, multiple BWPs may have different SCSs and different bandwidths.

In one example, the channel bandwidth of one component carrier is divided into BWP #1 and BWP #2, and these two BWPs are used for FDM schemes using different numerologies (e.g., different subcarrier spacing). In another example, narrowband BWP #1 is set in a channel bandwidth of one component carrier and narrowband BWP #2 narrower than BWP #1 is further set within the BWP #1. When BWP #1 or BWP #2 is activated for the UE, this UE can reduce its power consumption by refraining from performing reception and transmission within the channel bandwidth except the active BWP.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not include an SS/PBCH block (SSB).

A BWP configuration includes, for example, numerology, a frequency location, and a bandwidth (e.g., the number of PRBs). In order to indicate the frequency location, common PRB indexing is used at least for a downlink (DL) BWP configuration in a Radio Resource Control (RRC) connected state. Specifically, an offset from PRB 0 to the lowest PRB of the SS/PBCH block to be accessed by a UE is configured by higher layer signaling. The reference point "PRB 0" is common to all the UEs that share the same wideband component One or more BWP configurations for each component carrier are semi-statically signaled to the UE. To be specific, for each UE-specific serving cell, one or more DL BWPs (e.g., up to four DL BWPs) and one or more UL BWPs (e.g., up to four UL BWPs) can be configured for the UE via a dedicated RRC message. One or more DL BWPs and one or more UL BWPs configured for the UE are referred to as a DL BWP set and a UL BWP set, respectively.

Each of the one or more BWPs (i.e., BWP set) configured for the UE can be activated and deactivated. The activated BWP is referred to as active BWP. Specifically, the UE receives signals on one or more active DL BWPs in the configured DL BWP set at a given time. Likewise, the UE transmits signals on one or more active UL BWPs in the configured UL BWP set at a given time. In the current specification, only one DL BWP and only one UL BWP are activated at a given time.

Next, cloud RAN (C-RAN) deployment of the NG-RAN is described. The NG-RAN consists of a set of gNBs connected to a 5GC via respective NG interfaces. The gNBs can be connected to each other via Xn interfaces. A gNB may consist of a gNB Central Unit (gNB-CU) and one or more gNB Distributed Units (gNB-DUs). The gNB-CU and the gNB-DU are connected to each other through an F1 interface. The gNB-CU is a logical node that hosts Radio Resource Control (RRC), Service Data Adaptation Protocol (SDAP), and Packet Data Convergence Protocol (PDCP) protocols of the gNB (or hosts the RRC and PDCP protocols of the gNB). The gNB-DU is a logical node that hosts Radio Link Control (RLC), MAC, and PHY Layers of the gNB.

Furthermore, the 3GPP has been studying CU-DU split architecture of LTE eNB. This intends to introduction of eNB-CU and eNB-DU.

CITATION LIST

Non Patent Literature

[Non Patent Literature 1] Nokia, Nokia Shanghai Bell, "Stage-2 description of euCA", 3GPP R2-1809245, 3GPP TSG-RAN WG2 Meeting #102, Busan, South Korea, 21-25 May 2018
[Non Patent Literature 2] Nokia, Nokia Shanghai Bell, "UE capability definitions for euCA", 3GPP R2-1809246, 3GPP TSG-RAN WG2 Meeting #102, Busan, South Korea, 21-25 May 2018
[Non Patent Literature 3] Nokia, Nokia Shanghai Bell, "MAC functionality for euCA", 3GPP R2-1809269, 3GPP TSG-RAN WG2 Meeting #102, Busan, South Korea, 21-25 May 2018
[Non Patent Literature 4] Nokia, Nokia Shanghai Bell, "Signalling for euCA (Enhancing LTE CA Utilization)", 3GPP RP-182006, 3GPP TSG RAN Meeting #81, Gold Coast, Australia, 10-13 Sep. 2018

SUMMARY OF INVENTION

Technical Problem

The inventors have studied the above-described enhancements to carrier aggregation and found various problems. For example, when the direct SCell state configuration is applied to the gNB CU-DU split architecture or the eNB CU-DU split architecture, it is not clear whether the node that determines the direct SCell state is the CU or the DU, and also not clear how the CU (or the DU) informs the DU (or the CU) about the direct SCell state.

One of the objects to be attained by embodiments disclosed herein is to provide apparatuses, methods, and programs that contribute to improvement for enabling direct SCell state configuration in CU-DU split architecture. It should be noted that this object is merely one of the objects to be attained by the embodiments disclosed herein. Other objects or problems and novel features will be made apparent from the following description and the accompanying drawings.

Solution to Problem

In a first aspect, a central unit of a base station includes at least one memory and at least one processor coupled to the at least one memory. The at least one processor is configured to send, to a distributed unit of the base station, a first message requesting addition of a secondary cell for carrier aggregation. The first message contains a first information element indicating that the secondary cell needs to be initially activated or dormant.

In a second aspect, a distributed unit of a base station includes at least one memory and at least one processor coupled to the at least one memory. The at least one processor is configured to receive, from a central unit of the base station, a first message requesting addition of a secondary cell for carrier aggregation. The first message contains a first information element indicating that the secondary cell needs to be initially activated or dormant.

In a third aspect, a method performed by a central unit of a base station includes sending, to a distributed unit of the base station, a first message requesting addition of a secondary cell for carrier aggregation. The first message contains a first information element indicating that the secondary cell needs to be initially activated or dormant.

In a fourth aspect, a method performed by a distributed unit of a base station, the method comprising receiving, from a central unit of the base station, a first message requesting addition of a secondary cell for carrier aggregation. The first message contains a first information element indicating that the secondary cell needs to be initially activated or dormant.

In a fifth aspect, a program includes instructions (software codes) that, when loaded into a computer, cause the computer to perform the method according to the above-described third or fourth aspect.

Advantageous Effects of Invention

According to the above-described aspects, it is possible to provide apparatuses, methods, and programs that provide improvement for enabling direct SCell state configuration in CU-DU split architecture.

BRIEF DESCRIPTION OF DRAWINGS

FIG. 4 is a diagram showing a specific example of a format of a UE CONTEXT SETUP REQUEST message;

FIG. 11 is a diagram showing a specific example of a format of a UE CONTEXT SETUP REQUEST message according to the third embodiment;

FIG. 12 is a diagram showing a specific example of a format of a UE CONTEXT MODIFICATION REQUEST message according to the third embodiment;

FIG. 13 is a diagram showing a specific example of a format of a UE INACTIVITY NOTIFICATION message according to the third embodiment;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

First Embodiment

Figure 1:
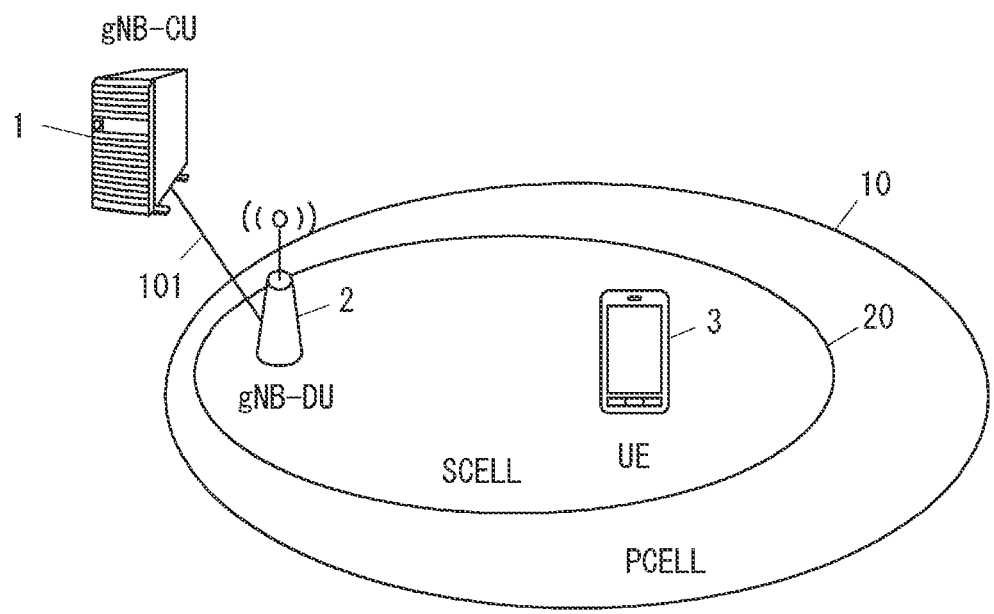
FIG. 1 is a diagram showing a configuration example of a radio communication network according to embodiments.

FIG. 1 shows a configuration example of a radio communication network according to a plurality of embodiments including this embodiment. In the example shown in FIG. 1, the radio communication network includes a gNB Central Unit (gNB-CU) 1, a gNB Distributed Unit (gNB-DU) 2, and a radio terminal (i.e., UE) 3. The gNB-CU 1 and the gNB-DU 2 are located in a Radio Access Network (RAN). The gNB-CU 1 and the gNB-DU 2 are connected to each other through an interface 101. The interface 101 is an F1 interface. The gNB-CU 1 may be connected to two or more gNB-DUs 2. The gNB-CU 1 may be a logical node that hosts the RRC, SDAP, and PDCP protocols of the gNB (or hosts the RRC and PDCP protocols of the gNB). The gNB-DU 2 may be a logical node that hosts the RLC, MAC, and PHY Layers of the gNB.

The gNB-CU 1 and the gNB-DU 2 provides the UE 3 with a primary cell (PCell) 10 and a secondary cell (SCell) 20. The UE 3 communicates with the gNB-CU 1 and the gNB-DU 2, using carrier aggregation (CA) between the primary cell (PCell) 10 and the secondary cell (SCell) 20. The UE 3 may be simultaneously connected to a plurality of base stations (i.e., Master gNB (MgNB) and Secondary gNB (SgNB) or Master Node (MN) and Secondary Node (SN)) for dual connectivity. In this case, the gNB-CU 1 and the gNB-DU 2 shown in FIG. 1 may be a CU and a DU of the MgNB or may be a CU and a DU of the SgNB. The PCell 10 and the SCell 20 shown in FIG. 1 may be a PCell and an SCell included in a Master Cell Group (MCG) or may be a Primary SCG Cell (PSCell) and an SCell included in a Secondary Cell Group (SCG). The PCell of the MCG and the PSCell of the SCG are each referred to as a Special Cell (SpCell).

Figure 2:
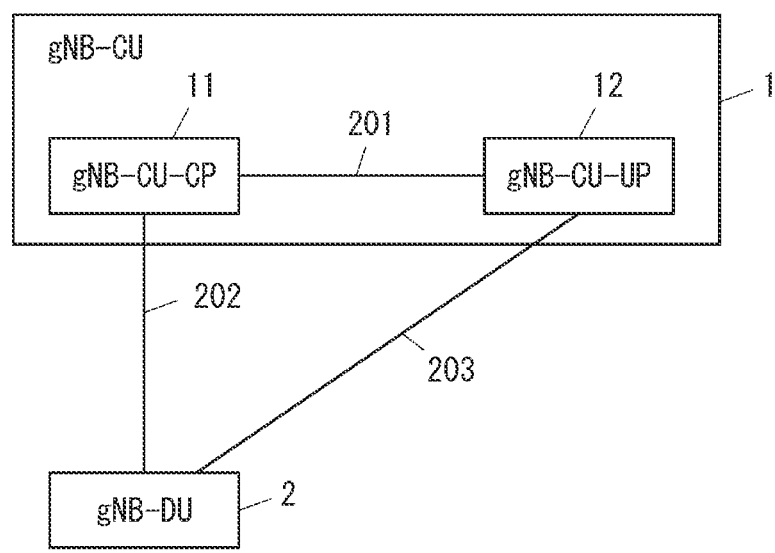
FIG. 2 is a diagram showing a configuration example of a radio communication network according to embodiments.

As shown in FIG. 2, the gNB-CU 1 may include a Control Plane (CP) Unit (i.e., gNB-CU-CP) 11 and one or more User Plane (UP) Units (i.e., gNB-CU-UPs) 12. In this case, the gNB-CU-CP 11 is connected to the gNB-CU-UP 12 through a control plane interface 201 (i.e., E1 interface). The gNB-CU-CP 11 is also connected to the gNB-DU 2 through a control plane interface 202 (i.e., F1-C interface). The gNB-CU-UP 12 is connected to the gNB-DU 2 through a user plane interface 203 (i.e., F1-U interface).

Figure 3:
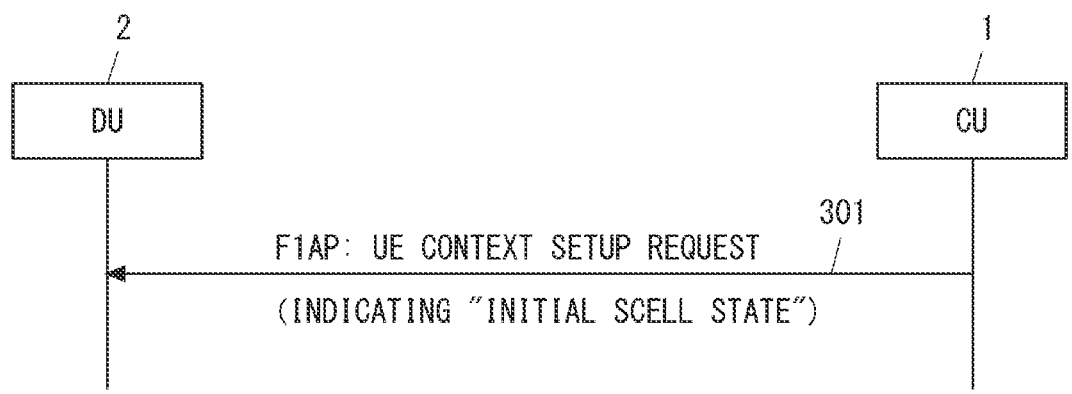
FIG. 3 is a sequence diagram showing an example of signalling between a central node and a distributed node according to a first embodiment.

FIG. 3 shows an example of operations of the gNB-CU 1 and the gNB-DU 2 according to the embodiment. In step 301, the gNB-CU 1 sends to the gNB-DU 2 a control message (i.e., F1 Application Protocol (F1AP) message) requesting addition of the SCell 20. The control message may be a UE CONTEXT SETUP REQUEST message or a UE CONTEXT MODIFICATION REQUEST message. The control message contains an information element (IE) indicating that the SCell 20 needs to be initially activated or dormant. In other words, when requesting the gNB-DU 2 to add the SCell 20, the gNB-CU 1 indicates to the gNB-DU 2 that the SCell 20 to be added shall be initially activated or dormant. The control message causes the gNB-DU 2 to make the added SCell 20 activated or dormant rather than deactivated. This operation enables a direct SCell state configuration in gNB CU-DU split architecture.

The information element that indicates the initial state of the SCell 20 may be, for example, an SCell State IE. The information element may be contained in SCell to Be Setup Item IEs contained in a UE CONTEXT SETUP REQUEST message or a UE CONTEXT MODIFICATION REQUEST message. The gNB-CU 1 may send this information element to the gNB-DU 2 only when the initial state of the SCell 20 is an activated state or a dormant state. If the F1AP message requesting addition of the SCell 20 does not contain the information element, the gNB-DU 2 may consider that the initial state of the SCell 20 is not specified or that the SCell 20 is permitted to be initially deactivated. FIG. 4 shows a specific example of a format of the UE CONTEXT SETUP REQUEST message improved to include the information element (i.e., SCell State IE) indicating the initial state of the SCell 20.

Figure 5:
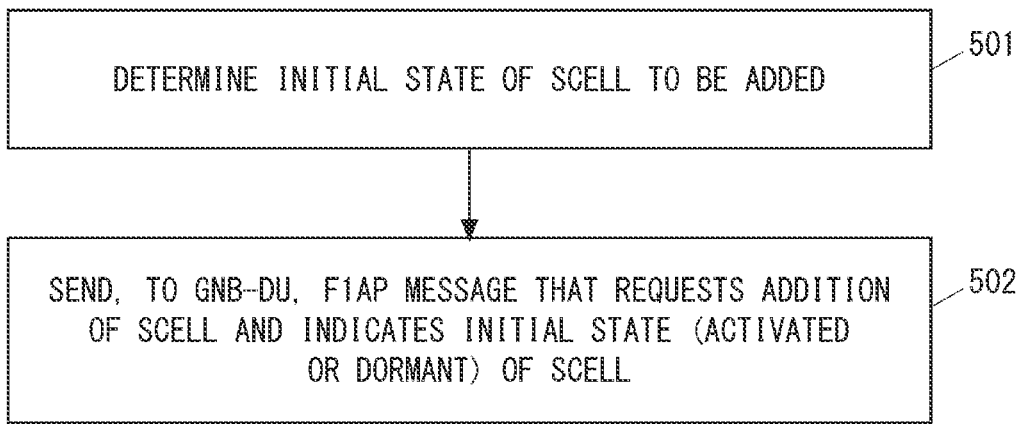
FIG. 5 is a flowchart showing an example of an operation of a central node according to the first embodiment.

FIG. 5 shows an example of an operation of the gNB-CU 1 according to the embodiment. In step 501, the gNB-CU 1 determines to add the SCell 20 for the UE 3 and further determines the initial state (i.e., activated, dormant, or deactivated) of the SCell 20 to be added. In step 502, the gNB-CU 1 sends to the gNB-DU 2 an F1AP message (e.g., UE CONTEXT SETUP REQUEST message or UE CONTEXT MODIFICATION REQUEST message) that requests addition of the SCell 20 and indicates the initial state of the SCell 20. This F1AP message may indicate that the initial state of the SCell 20 is the activated state or the dormant state. In other words, the F1AP message may indicate that the SCell 20 should not be initially deactivated.

Figure 6:
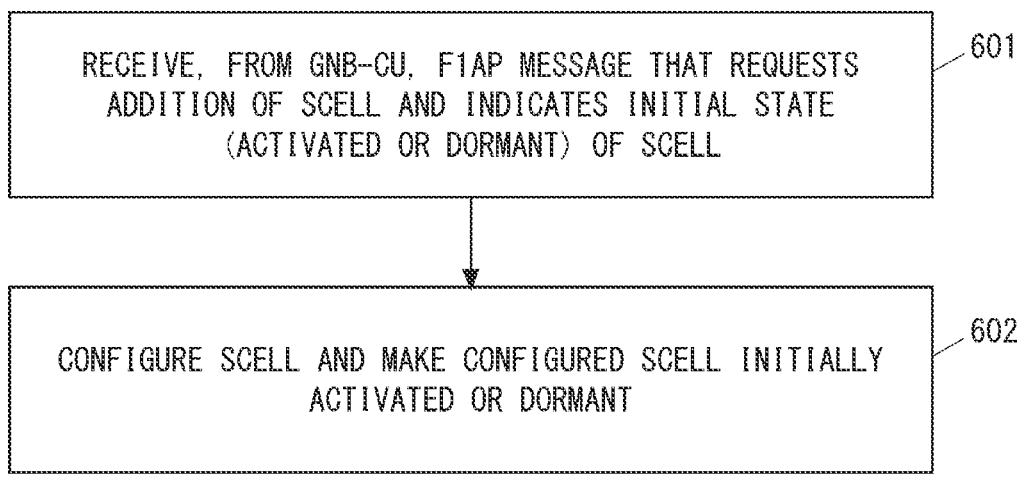
FIG. 6 is a flowchart showing an example of an operation of a distributed node according to the first embodiment.

FIG. 6 shows an example of an operation of the gNB-CU2 according to the embodiment. In step 601, the gNB-CU2 receives from the gNB-CU 1 an F1AP message that requests addition of the SCell 20 and indicates the initial state (the activated state or the dormant state) of the SCell 20. In step 602, the gNB-DU 2 configures the SCell 20 in response to receiving the message. Furthermore, the gNB-DU 2 makes the added SCell 20 activated or dormant rather than deactivated.

In some implementations, the gNB-DU 2 may send a response message to the gNB-CU 1. The response message may be an F1AP: UE CONTEXT SETUP RESPONSE message or an F1AP: UE CONTEXT MODIFICATION RESPONSE message. The gNB-DU 2 may include an information element indicating the initial state of the added SCell 20 in the response message. The information element may be an sCellState IE and may be contained in a CellGroupConfig IE. The CellGroupConfig IE is contained in a DU to CU RRC Information IE carried from the gNB-DU 2 to the gNB-CU 1 by a UE CONTEXT SETUP RESPONSE (or UE CONTEXT MODIFICATION RESPONSE) message.

In some implementations, the gNB-CU 1 may receive from the gNB-DU 2 an F1AP message containing assistance information and then determine based on the assistance information that the SCell 20 shall be initially activated or dormant. Put another way, the gNB-CU 1 may determine that the SCell 20 should not be initially deactivated. That is, the assistance information causes the gNB-CU 1 to determine that the SCell 20 should be activated or dormant. The F1AP message carrying the assistance information may be a UE CONTEXT MODIFICATION REQUIRED message.

The assistance information may contain, for example, but not limited to, the following information. The assistance information may contain information about load status of a cell being used as a serving cell of the UE 3 (e.g., cell load, radio resource usage, or number of active UEs). Additionally or alternatively, the assistance information may contain utilization status that indicates how the UE 3 uses each serving cell (e.g., cell usage or cell utilization status). Additionally or alternatively, the assistance information may contain information about QoS satisfaction of the UE 3 (e.g., QoS performance, QoS satisfaction, or gap to required/expected QoS). Additionally or alternatively, the assistance information may contain information about characteristics expected by the UE 3 (e.g., expected/target data rate or throughput).

Second Embodiment

A configuration example of a radio communication network according to the embodiment is similar to the example shown in FIGS. 1 and 2. The embodiment provides an example in which the gNB-DU 2 determines the initial state of the SCell 20 to be added.

Figure 7:
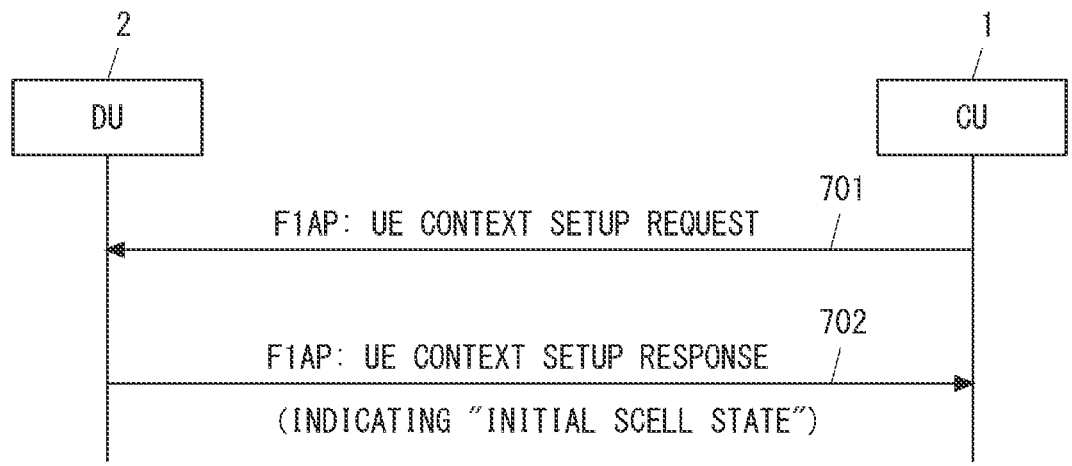
FIG. 7 is a sequence diagram showing an example of signalling between a central node and a distributed node according to a second embodiment.

FIG. 7 shows an example of operations of the gNB-CU 1 and the gNB-DU 2 according to the embodiment. In step 701, the gNB-CU 1 sends to the gNB-DU 2 a control message (i.e., F1 Application Protocol (F1AP) message) requesting addition of the SCell 20. The control message may be a UE CONTEXT SETUP REQUEST message or a UE CONTEXT MODIFICATION REQUEST message.

In step 702, in response to receiving the message in step 701, the gNB-DU 2 adds the SCell 20 and determines the initial state of SCell 20 (i.e., activated, dormant, or deactivated). For example, the gNB-DU 2 determines that the SCell 20 to be added will be immediately activated or made dormant rather than being deactivated. Then, the gNB-DU 2 sends the gNB-CU 1 a response message that contains an information element indicating the initial state of the SCell 20. The gNB-DU 2 may send this information element to the gNB-CU 1 only when the initial state of SCell 20 is the activated state or the dormant state. In this case, if the message from the gNB-DU 2 does not contain the information element, the gNB-CU 1 may consider that the initial state of SCell 20 is initially deactivated.

The information element may be, for example, an SCell-State IE. The information element may be contained in a CellGroupConfig IE. The CellGroupConfig IE is contained in a DU to CU RRC Information IE carried from the gNB-DU 2 to the gNB-CU 1 by a UE CONTEXT SETUP RESPONSE (or UE CONTEXT MODIFICATION RESPONSE) message.

If the gNB-DU 2 operates a plurality of SCell 20s, the gNB-DU 2 may send to the gNB-CU 1 a response message including an information element (e.g., sCellState IE) that indicates the initial state of each SCell 20 on a per SCell basis. That is, the above-described information element indicating the initial state of the SCell 20 may be a list of sCellState IEs (sCellStateList IE).

The operation shown in FIG. 7 enables a direct SCell state configuration in gNB CU-DU split architecture.

In some implementations, to assist the gNB-DU 2 in determining the initial state of the SCell 20, the gNB-CU 1 may include assistance information in the message in step 701. The assistance information may be taken into consideration by the gNB-DU 2 in determining the initial state of the SCell 20 to be added. For example, the assistance information may indicate whether addition of the SCell 20 is urgent. If the assistance information indicates urgency of adding the SCell 20, the gNB-DU 2 may configure the SCell 20 to make the initial state of the SCell 20 activated or dormant.

Additionally or alternatively, the assistance information may indicate an intended use or necessity of the SCell 20

(e.g., urgent, load balancing, or normal). Additionally or alternatively, the assistance information may indicate a purpose of adding the SCell 20 (e.g., load balancing, or throughput (improvement)).

Additionally or alternatively, the assistance information may contain information about a PDCP buffer of the gNB-CU 1 (e.g., PDCP buffer status, or PDCP buffer usage radio). This information may indicate utilization status (or load) of the PDCP buffer of the gNB-CU 1. In other words, the information may indicate that addition of the SCell 20 is needed because the utilization (or load) of the PDCP buffer of the gNB-CU 1 is high.

Figure 8:
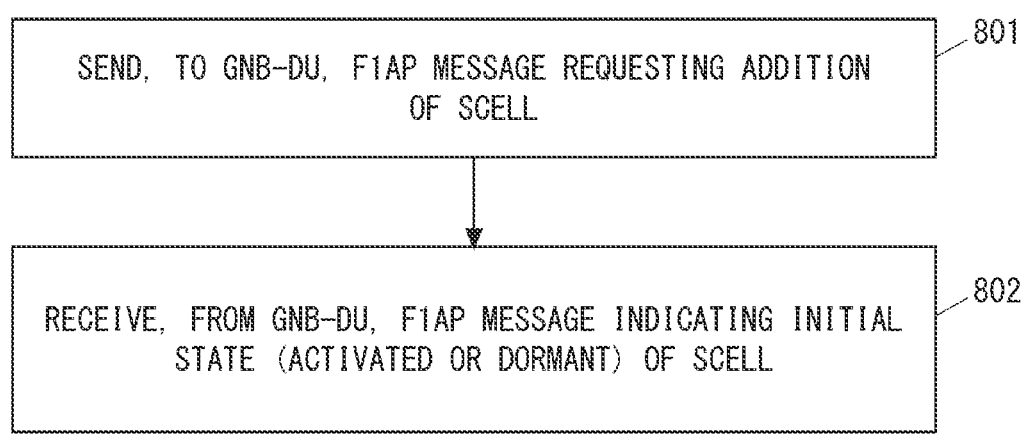
FIG. 8 is a flowchart showing an example of an operation of a central node according to the second embodiment.

FIG. 8 shows an example of an operation of the gNB-CU 1 according to the embodiment. In step 801, the gNB-CU 1 determines to add the SCell 20 for the UE 3 and sends to the gNB-DU 2 an F1AP message requesting addition of the SCell 20. This F1AP message may be, for example, a UE CONTEXT SETUP REQUEST message or a UE CONTEXT MODIFICATION REQUEST message. In step 802, the gNB-CU 1 receives an F1AP message indicating the initial state of the SCell 20 from the gNB-DU 2. This F1AP message may be, for example, a UE CONTEXT SETUP RESPONSE message or a UE CONTEXT MODIFICATION RESPONSE message.

Figure 9:
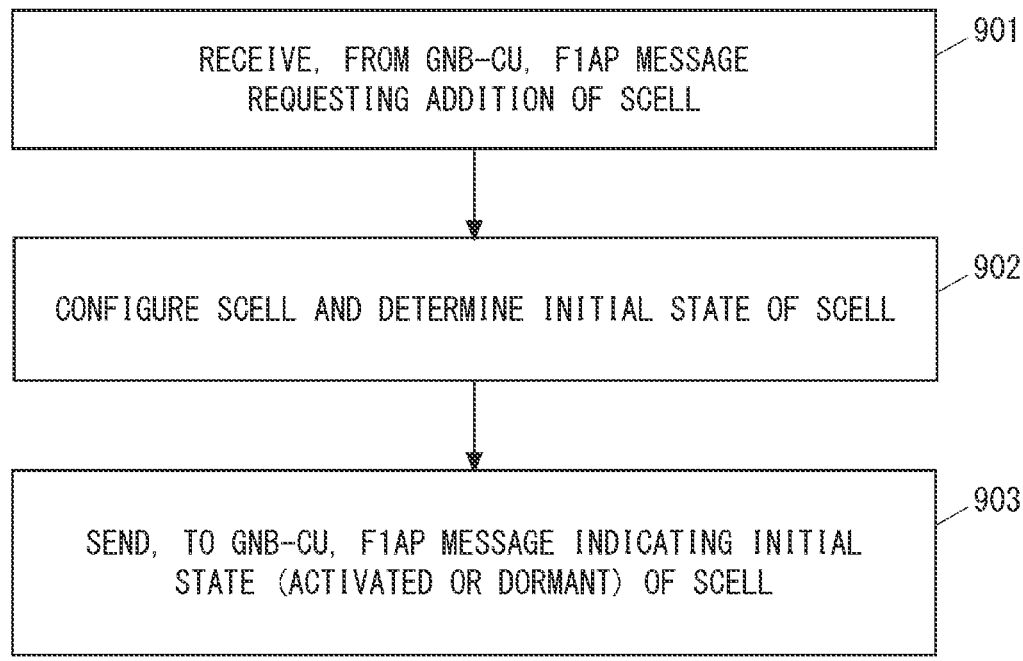
FIG. 9 is a flowchart showing an example of an operation of a distributed node according to the second embodiment.

FIG. 9 shows an example of an operation of the gNB-DU 2 according to the embodiment. In step 901, the gNB-DU 2 receives from the gNB-CU 1 an F1AP message requesting addition of the SCell 20. In step 902, the gNB-DU 2 configures the SCell 20 in response to the reception of the message. Furthermore, the gNB-DU 2 determines the initial state of the SCell 20 to be added. For example, the gNB-DU 2 makes the added SCell 20 activated or dormant rather than deactivated. In step 903, the gNB-DU 2 sends to the gNB-CU 1 an F1AP message (e.g., UE CONTEXT SETUP RESPONSE message or UE CONTEXT MODIFICATION RESPONSE message) indicating the initial state of the SCell 20.

Third Embodiment

A configuration example of a radio communication network according to the embodiment is similar to the examples shown in FIGS. 1 and 2. In this embodiment, after the SCell 20 is added for the UE 3, the gNB-CU 1 instructs the gNB-DU 2, or proposes to the gNB-DU 2, to switch the state of the SCell 20 among the activated state, the dormant state, and the deactivated state. This operation allows the gNB-CU 1 to control the current state of the SCell 20.

Figure 10:
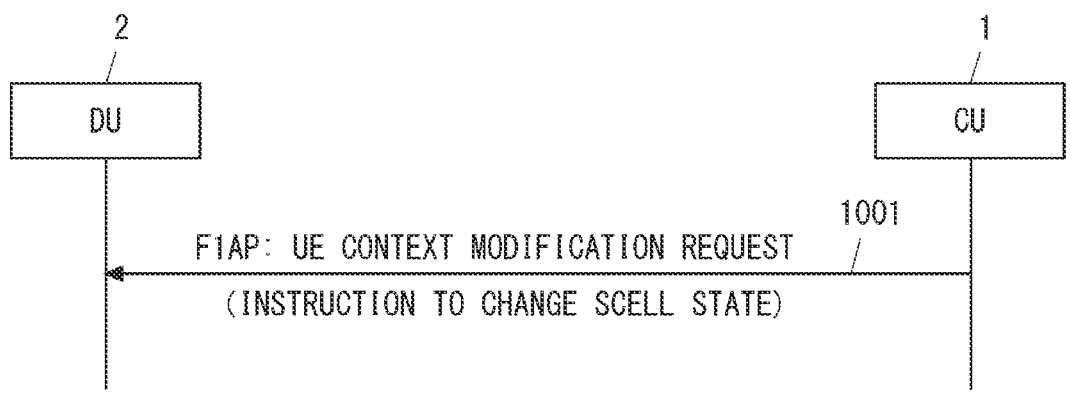
FIG. 10 is a sequence diagram showing an example of signalling between a central node and a distributed node according to a third embodiment.

FIG. 10 shows an example of operations of the gNB-CU 1 and the gNB-DU 2 according to the embodiment. In step 1001, the gNB-CU 1 sends to gNB-DU 2 an F1AP message that instructs gNB-DU 2, or proposes to gNB-DU 2, to change the state of the SCell 20. The F1AP message may be, for example, a UE CONTEXT MODIFICATION REQUEST message.

In some implementations, the gNB-CU 1 may include an information element in the UE CONTEXT MODIFICATION REQUEST message to cause the gNB-DU 2 to change the state of the SCell 20. The information element may be an SCell State IE. The information element may be newly defined and contained in SCell to Be Modify Item IEs included in the UE CONTEXT MODIFICATION REQUEST message.

In some implementations, in order to cause the gNB-DU 2 to change the state of the SCell 20, gNB-CU 1 may include both an information element(s) indicating removal of the SCell 20 and an information element(s) indicating setup of the SCell 20 in a single UE CONTEXT MODIFICATION REQUEST message. The information element(s) indicating removal of the SCell 20 may be SCell to Be Removed Item IEs, while the information element(s) indicating setup of the SCell 20 may be SCell to Be Setup Item IEs. In that case, the SCell to Be Setup Item IEs may contain an information element (e.g., SCell State IE) indicating a change in the state of the SCell 20.

In some implementations, in order to cause the gNB-DU 2 to change the state of the SCell 20, the gNB-CU 1 may send, to the gNB-DU 2, cause indicating a purpose or background of the changing the state. The cause may be, for example, information indicating that the UE 3 is in an overheated state (i.e., the UE 3 is overheating) or information indicating that it is intended to solve the overheating issue. For example, the gNB-CU 1 may send this cause to the gNB-DU 2 together with an instruction or proposal to make the SCell 20 dormant or deactivated. Alternatively, gNB-CU 1 may determine to remove the SCell 20 from the settings for the UE 3 in response to receiving a report about overheating (e.g., overheating assistance information) from the UE 3, and then send the cause to the gNB-DU 2 together with an information element indicating the removal of the SCell 20.

In some implementations, the gNB-DU 2 may send, to the gNB-CU 1, information about activity of the UE 3 associated with SCell 20. Specifically, the gNB-CU 1 may send to the gNB-DU 2 an F1AP message that contains an information element indicating that the activity of the UE 3 is permitted to be monitored (or is desired to be monitored). This F1AP message may be a UE CONTEXT SETUP REQUEST message (see FIG. 11) or a UE CONTEXT MODIFICATION REQUEST message (see FIG. 12). The messages shown in FIGS. 11 and 12 contain an Inactivity Monitoring Request IE that indicates whether the activity of the UE 3 is permitted to be monitored (or is needed to be monitored). If the gNB-CU 1 permits (or requests) the gNB-DU 2 to monitor the activity of the UE 3, the gNB-CU 1 sets a value of "True" to the Inactivity Monitoring Request IE. The gNB-DU 2 may send an F1AP: UE INACTIVITY NOTIFICATION message to the gNB-CU 1. The activity information indicates whether a communications state of the UE 3 (or a state of data radio bearer (DRB) of the UE 3, or data communications status linked to logical channel identity (LCID)) in the SCell 20 is active or not. The activity information may be referred to as inactivity information.

The use of the UE activity based on the data communications status linked to the LCID is effective, for example, in implementations in which DRB data is transmitted or received only through a specific servicing cell. More specifically, in some implementations, the UE 3 allows to transmit uplink data of a certain DRB only through a specific servicing cell (allowed Serving Cell) permitted in advance by RRC signaling of the gNB (e.g., the gNB-CU 1). Similarly, the UE 3 allows to receive downlink data only through a specific servicing cell according to a determination of the gNB (e.g., the gNB-DU 2). This is a technique essential in transmitting or receiving data on an original logical channel (e.g., LCID #1) and data on additional logical channel (e.g., LCID #2) for packet duplication via respective servicing cells different from each other, in packet duplication (or CA-type PDCP duplication) in which one PDCP packet (i.e., PDCP SDU) is transmitted redundantly during execution of carrier aggregation (CA). Furthermore, this technique can be used regardless of the presence or absence of packet duplication. When LCID is linked to a specific servicing cell in this way, monitoring the activity of the LCID by the gNB- DU 2 and providing the resulting information from the gNB-DU 2 to the gNB-CU 1 is effective in managing the SCell state.

The gNB-CU 1 may determine to change the state of the SCell 20 on the basis of the received activity information. Specifically, if the activity information indicates that the UE 3 (or a DRB of the UE 3, or a logical channel) is not active, the gNB-CU 1 may determine to change the state of the SCell 20 from activated to dormant, or from activated to deactivated. FIG. 13 shows a specific example of a UE INACTIVITY NOTIFICATION message. In the example of FIG. 13, an SCell Activity List IE indicates the activity of the UE 30 per SCell (SCell Activity IE).

Fourth Embodiment

A configuration example of a radio communication network according to the embodiment is similar to the examples shown in FIGS. 1 and 2. In this embodiment, after the SCell 20 is added for the UE 3, the gNB-DU 2 switches the state of the SCell 20 among the activated state, the dormant state, and the deactivated state. The gNB-DU 2 may determine the state of the SCell 20 based on assistance information from the gNB-CU 1. This operation allows the gNB-DU 2 to control the current state of the SCell 20.

Figure 14:
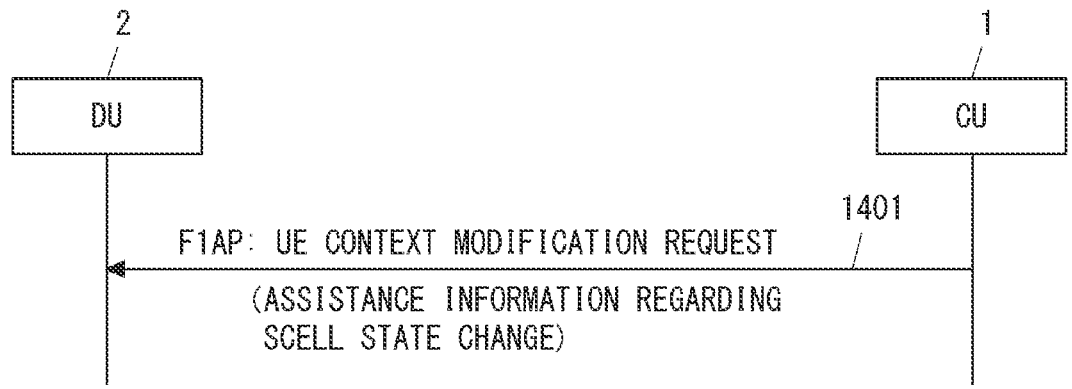
FIG. 14 is a sequence diagram showing an example of signalling between a central node and a distributed node according to a fourth embodiment.

FIG. 14 shows an example of operations of the gNB-CU 1 and the gNB-DU 2 according to the embodiment. In step 1401, the gNB-CU 1 sends to the gNB-DU 2 an F1AP message containing assistance information regarding a change in the state of the SCell 20. The F1AP message may be, for example, a UE CONTEXT MODIFICATION REQUEST message.

In some implementations, the gNB-CU 1 may include the assistance information regarding a change in the state of the SCell 20 in the UE CONTEXT MODIFICATION REQUEST message. The assistance information may concern a load or situation of the UE 3. The assistance information may be an Overheating Assistance IE. The Overheating Assistance IE may be equivalent or related to information (e.g., overheating assistance information) about an overheating problem reported to the gNB (e.g., the gNB-CU) by the UE 3 via RRC signaling. The Overheating Assistance IE may contain information regarding settings recommended to solve a heating problem (e.g., reduced UE Category, reduced Max CCs, reduced Max MIMO layers, or reduced Max active BWPs).

The assistance information may be contained in SCell to Be Modify Item IEs that is newly defined and included in the UE CONTEXT MODIFICATION REQUEST message. The gNB-DU 2 may determine to change the state of the SCell 20 on the basis of the assistance information. For example, the gNB-DU 2 may determine to change the SCell 20 in the activated state to the dormant state or the deactivated state, and then give the UE 3 an instruction about the change. Alternatively, the gNB-DU 2 may determine removal of the SCell 20 and request the gNB-CU 1, or propose to the gNB-CU 1, to the remove SCell 20. This allows the gNB-DU 2 to manage the state of the SCell 20 while considering the load or situation of the UE 3.

Fifth Embodiment

A configuration example of a radio communication network according to the embodiment is similar to the examples shown in FIGS. 1 and 2. In this embodiment, the gNB-CU 1 instructs the gNB-DU 2, or proposes to the gNB-DU 2, to activate two or more downlink BWPs out of a plurality of BWPs configured for the SCell 20. The plurality of BWPs (i.e., BWP set) configured for the SCell 20 may be either DL BWPs or UL BWPs. Based on the instruction or proposal from the gNB-CU 1, gNB-DU 2 may activate two or more downlink BWPs of the SCell 20. This operation allows the gNB-CU 1 to control the number of active BWPs of the SCell 20.

Figure 15:
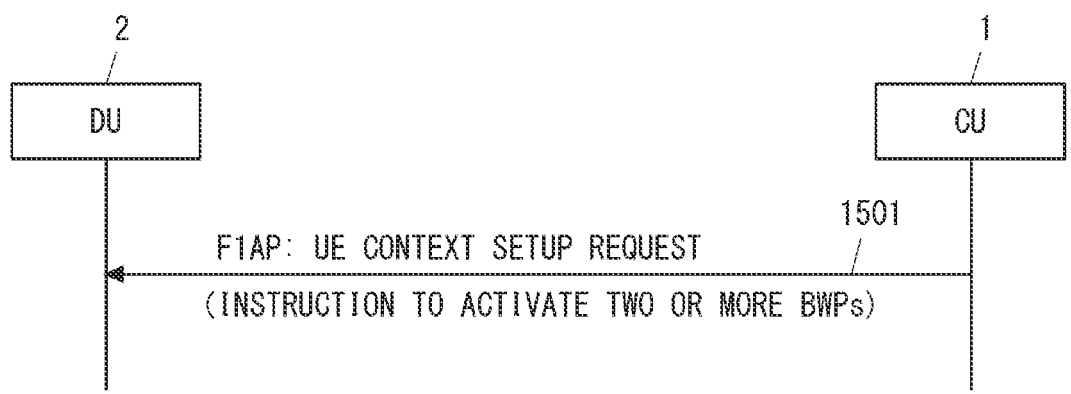
FIG. 15 is a sequence diagram showing an example of signalling between a central node and a distributed node according to a fifth embodiment.

FIG. 15 shows an example of operations of the gNB-CU 1 and the gNB-DU 2 according to the embodiment. In step 1501, the gNB-CU 1 sends to the gNB-DU 2 an F1AP message that instructs the gNB-DU 2, or proposes to gNB-DU 2, to activate two or more downlink BWPs of the SCell 20. In some implementations, the gNB-CU 1 may include an information element indicating the number of BWPs to be activated, in an F1AP message (e.g., UE CONTEXT SETUP REQUEST message or UE CONTEXT MODIFICATION REQUEST message) requesting addition of the SCell 20. Additionally or alternatively, the gNB-CU 1 may include an information element indicating the number of BWPs to be activated, in an F1AP message (e.g., UE CONTEXT MODIFICATION REQUEST message) requesting modification of an UE context.

Figure 16:
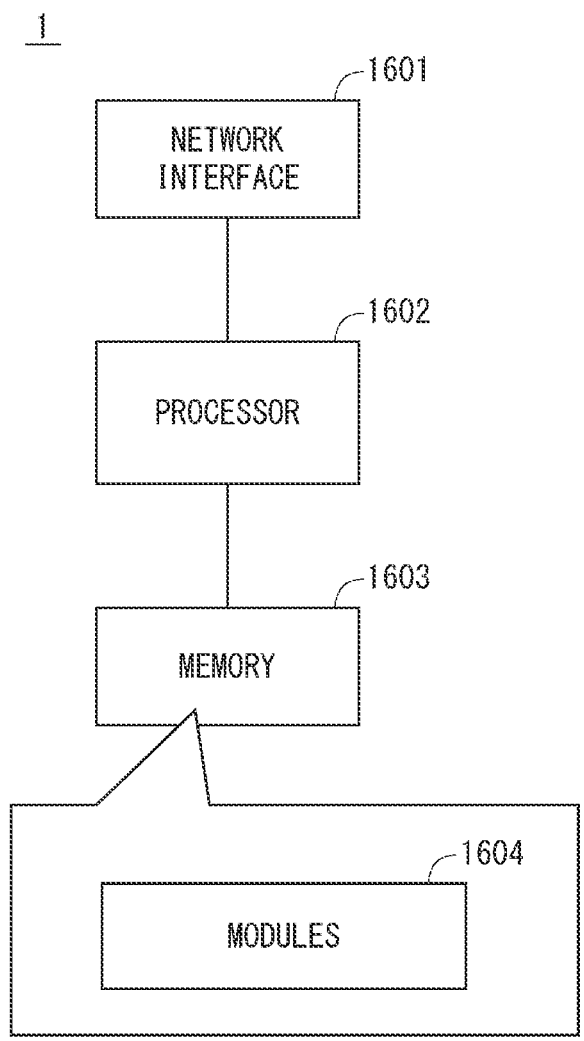
FIG. 16 is a block diagram showing a configuration example of a central node (e.g., gNB-CU) according to embodiments.

The following provides configuration examples of the gNB-CU 1 and the gNB-DU 2 according to the above embodiments. FIG. 16 is a block diagram showing a configuration example of the gNB-CU 1 according to the above embodiments. The gNB-CU-CP 11 and the gNB-CU-UP 12 may have a configuration similar to that shown in FIG. 16. Referring to FIG. 16, the gNB-CU 1 includes a network interface 1601, a processor 1602, and a memory 1603. The network interface 1601 is used to communicate with network nodes (e.g., the gNB-DU 2, and control-plane (CP) nodes and user-plane (UP) nodes in the 5GC). The network interface 1601 may include a plurality of interfaces. The network interface 1601 may include an optical-fiber interface for CU-DU communication and a network interface conforming to IEEE 802.3 series.

The processor 1602 performs digital baseband signal processing (i.e., data-plane processing) and control-plane processing for radio communication. The processor 1602 may include a plurality of processors. The processor 1602 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing.

The memory 1603 is a volatile memory, a nonvolatile memory, or a combination thereof. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1603 may include a storage located separately from the processor 1602. In this case, the processor 1602 may access the memory 1603 through the network interface 1601 or an I/O interface (not shown).

The memory 1603 may store one or more software modules (computer programs) 1604 including instructions and data to perform processing by the gNB-CU 1 described in the above embodiments. In some implementations, the processor 1602 may load the one or more software modules 1604 from the memory 1603 and execute the loaded software modules, thereby performing the processing of the gNB-CU 1 described in the above embodiments.

Figure 17:
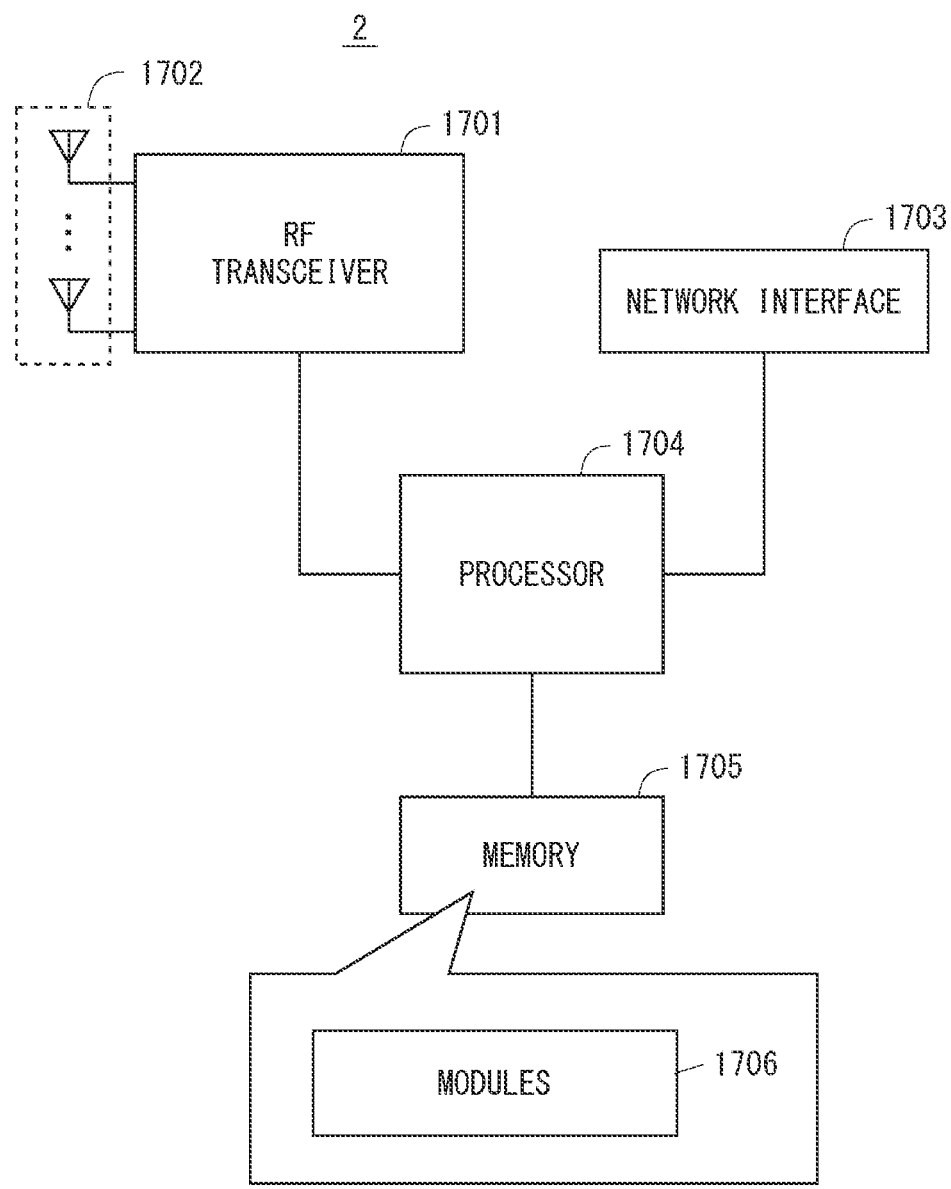
FIG. 17 is a block diagram showing a configuration example of a distributed node (e.g., gNB-DU) according to embodiments.

FIG. 17 is a block diagram showing a configuration example of the gNB-DU 2 according to the above embodiments. Referring to FIG. 17, the gNB-DU 2 includes a Radio Frequency transceiver 1701, a network interface 1703, a processor 1704, and a memory 1705. The RF transceiver 1701 performs analog RF signal processing to communicate with NG UEs. The RF transceiver 1701 may include a plurality of transceivers. The RF transceiver 1701 is connected to an antenna array 1702 and the processor 1704. The RF transceiver 1701 receives modulated symbol data from the processor 1704, generates a transmission RF signal, and supplies the generated transmission RF signal to the antenna 1702. Further, the RF transceiver 1701 generates a baseband reception signal based on a reception RF signal received by the antenna 1702 and supplies this signal to the processor 1704. The RF transceiver 1701 may include an analog beam former circuit for beam forming. The analog beam former circuit includes, for example, a plurality of phase shifters and a plurality of power amplifiers.

The network interface 1703 is used to communicate with network nodes (e.g., the gNB-CU 1, the gNB-CU-CP 11, and the gNB-CU-UP 12). The network interface 1703 may include a plurality of interfaces. The network interface 1703 may include either or both of an optical-fiber interface for CU-DU communication and a network interface conforming to IEEE 802.3 series.

The processor 1704 performs digital baseband signal processing (i.e., data-plane processing) and control-plane processing for radio communication. The processor 1704 may include a plurality of processors. The processor 1704 may include a modem processor (e.g., a DSP)) that performs the digital baseband signal processing and a protocol stack processor (e.g., a CPU or an MPU) that performs the control-plane processing. The processor 1704 may include a digital beam former module for beam forming. The digital beam former module may include a Multiple Input Multiple Output (MIMO) encoder and a MIMO pre-coder.

The memory 1705 is a volatile memory, a nonvolatile memory, or a combination thereof. The volatile memory is, for example, an SRAM, a DRAM, or a combination thereof. The non-volatile memory is, for example, an MROM, an EEPROM, a flash memory, a hard disc drive, or any combination thereof. The memory 1705 may include a storage located separately from the processor 1704. In this case, the processor 1704 may access the memory 1705 through the network interface 1703 or an I/O interface (not shown).

The memory 1705 may store one or more software modules (computer programs) 1706 including instructions and data to perform processing by the gNB-DU 2 described in the above embodiments. In some implementations, the processor 1704 may load the one or more software modules 1706 from the memory 1705 and execute the loaded software modules, thereby performing the processing of the gNB-DU 2 described in the above embodiments.

As described above with reference to FIGS. 16 and 17, each of the processors included in the gNB-CU 1 and the gNB-DU 2 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

The signaling between gNB-CU 1 and gNB-DU 2 described in the above embodiments may be done between gNB-CU-CP11 and gNB-DU 2.

The above embodiments have been described by assuming gNB-CU 1 and gNB-DU 2 in a 5G system, but they are also applicable to other network configurations. For example, LTE eNB connected to 5GC is also referred to as ng-eNB (or eLTE eNB) and assumes that functions of ng-eNB are distributed to CU (i.e., ng-eNB-CU) and DU (i.e., ng-eNB-DU) as with gNB. Signaling equal to or similar to the signaling through F1 interfaces between gNB-CU 1 and gNB-DU 2 described in the above embodiments may be done through an interface (e.g., W1 interface) between ng-eNB-CU and ng-eNB-DU.

Further, the above embodiments are merely examples of applications of the technical ideas obtained by the inventors. These technical ideas are not limited to the above embodiments and various modifications may be made thereto.

For example, the whole or part of the embodiments disclosed above can be described as, but not limited to, the following supplementary notes.

(Supplementary Note 1)

A distributed unit of a base station, the distributed unit comprising:
  at least one memory; and
  at least one processor coupled to the at least one memory and configured to:
    receive, from a central unit of the base station, a first message requesting addition of a secondary cell for carrier aggregation;
    in response to the first message, determine that the secondary cell is to be initially activated or dormant; and
    send to the central unit a second message indicating that the secondary cell is to be initially activated or dormant.

(Supplementary Note 2)

The distributed unit according to Supplementary Note 1, wherein the first message contains assistance information indicating whether the addition of the secondary cell is urgent.

(Supplementary Note 3)

The distributed unit according to Supplementary Note 1, wherein the first message contains assistance information regarding a purpose of the addition of the secondary cell.

(Supplementary Note 4)

A central unit of a base station, the central unit comprising:
  at least one memory; and
  at least one processor coupled to the at least one memory and configured to:

send, to a distributed unit of the base station, a first message requesting addition of a secondary cell for carrier aggregation; and receive from the distributed unit a second message indicating that the secondary cell is to be initially activated or dormant.

(Supplementary Note 5)

The central unit according to Supplementary Note 4, wherein the first message contains assistance information indicating whether the addition of the secondary cell is urgent.

(Supplementary Note 6)

The central unit according to Supplementary Note 4, wherein the first message contains assistance information regarding a purpose of adding the secondary cell.

(Supplementary Note 7)

A central unit of a base station, the central unit comprising:

at least one memory; and at least one processor coupled to the at least one memory and configured to send, to a distributed unit of the base station, a first message that instructs the distributed unit, or proposes to the distributed unit, to change a state of a secondary cell for carrier aggregation or remove the secondary cell.

(Supplementary Note 8)

The central unit according to Supplementary Note 7, wherein the first message contains cause information indicating a purpose of changing the state of the secondary cell or removing the secondary cell.

(Supplementary Note 9)

The central unit according to Supplementary Note 8, wherein the cause information indicates that a radio terminal associated with the secondary cell is overheated or indicates that it is intended to solve a overheated state of the radio terminal.

(Supplementary Note 10)

The central unit according to any one of Supplementary Notes 7 to 9, wherein the at least one processor is configured to receive, from the distributed unit, activity information about a radio terminal associated with the secondary cell.

(Supplementary Note 11)

The central unit according to Supplementary Note 10, wherein the activity information indicates activity of the radio terminal in each of a plurality of secondary cells that have been activated for the radio terminal.

(Supplementary Note 12)

The central unit according to Supplementary Note 10 or 11, wherein the at least one processor is configured to determine to change the state of the secondary cell or remove the secondary cell based on the activity information.

(Supplementary Note 13)

A distributed unit of a base station, the distributed unit comprising:

at least one memory; and at least one processor coupled to the at least one memory and configured to receive, from a central unit of the base station, a first message that instructs the distributed unit, or proposes to the distributed unit, to change a state of a secondary cell for carrier aggregation or remove the secondary cell.

(Supplementary Note 14)

A distributed unit of a base station, the distributed unit comprising:

at least one memory; and at least one processor coupled to the at least one memory and configured to receive, from a central unit of the base station, assistance information regarding a change in a state of a secondary cell for carrier aggregation or removal of the secondary cell.

(Supplementary Note 15)

The distributed unit according to Supplementary Note 14, wherein the at least one processor is configured to determine to change the state of the secondary cell or remove the secondary cell based on the assistance information.

(Supplementary Note 16)

The distributed unit according to Supplementary Note 14 or 15, wherein the assistance information indicates a load or situation of a radio terminal associated with the secondary cell.

(Supplementary Note 17)

A central unit of a base station, the central unit comprising:

at least one memory; and at least one processor coupled to the at least one memory and configured to send, to a distributed unit of the base station, assistance information regarding a change in a state of a secondary cell for carrier aggregation or removal of the secondary cell.

(Supplementary Note 18)

A central unit of a base station, the central unit comprising:

at least one memory; and at least one processor coupled to the at least one memory and configured to send, to a distributed unit of the base station, a message that instructs the distributed unit, or proposes to the distributed unit, to activate two or more downlink bandwidth parts (BWPs) out of a plurality of downlink BWPs configured for a secondary cell of carrier aggregation.

(Supplementary Note 19)

A distributed unit of a base station, the distributed unit comprising:

at least one memory; and at least one processor coupled to the at least one memory and configured to receive, from a central unit of the base station, a message that instructs the distributed unit, or proposes to the distributed unit, to activate two or more downlink bandwidth parts (BWPs) out of a plurality of downlink BWPs configured for a secondary cell of carrier aggregation.

(Supplementary Note B1)

A central unit of a base station, the central unit comprising:

at least one memory; and at least one processor coupled to the at least one memory and configured to send, to a distributed unit of the base station, a first message requesting addition of a secondary cell for carrier aggregation, wherein the first message contains a first information element indicating that the secondary cell needs to be initially activated or dormant.

(Supplementary Note B2)

The central unit according to Supplementary Note B1, wherein the first information element causes the distributed unit to make the added secondary cell activated or dormant rather than deactivated.

(Supplementary Note B3)

The central unit according to Supplementary Note B1 or B2, wherein the at least one processor is configured to receive a second message containing assistance information from the distributed unit and determine, based on the assistance information, that the secondary cell is to be activated or dormant.

(Supplementary Note B4)

The central unit according to any one of Supplementary Notes B1 to B3, wherein the at least one processor is further configured to, after the addition of the secondary cell, send to the distributed unit a third message that instructs the distributed unit, or proposes to the distributed unit, to switch a state of the secondary cell among an activated state, a dormant state, and a deactivated state.

(Supplementary Note B5)

The central unit according to Supplementary Note B4, wherein the at least one processor is further configured to receive, from the distributed unit, activity information about a radio terminal associated with the secondary cell and determine to change a state of the secondary cell based on the activity information.

(Supplementary Note B6)

The central unit according to any one of Supplementary Notes B1 to B5, wherein the first message further contains a second information element instructing the distributed unit, or proposing to the distributed unit, to activate two or more downlink bandwidth parts (BWPs) out of a plurality of downlink BWPs of the secondary cell.

(Supplementary Note B7)

The central unit according to any one of Supplementary Notes B1 to B5, wherein the at least one processor is further configured to send to the distributed unit a fourth message that instructs the distributed unit, or proposes to the distributed unit, to activate two or more downlink bandwidth parts (BWPs) out of a plurality of downlink BWPs of the secondary cell.

(Supplementary Note B8)

A distributed unit of a base station, the distributed unit comprising:
 at least one memory; and
 at least one processor coupled to the at least one memory and configured to receive, from a central unit of the base station, a first message requesting addition of a secondary cell for carrier aggregation, wherein
 the first message contains a first information element indicating that the secondary cell needs to be initially activated or dormant.

(Supplementary Note B9)

The distributed unit according to Supplementary Note B8, wherein the at least one processor is further configured to make the added secondary cell activated or dormant rather than deactivated.

(Supplementary Note B10)

The distributed unit according to Supplementary Note B8 or B9, wherein the at least one processor is configured to send a second message containing assistance information to the central unit,
 wherein the assistance information causes the central unit to determine that the secondary cell is to be activated or dormant.

(Supplementary Note B11)

The distributed unit according to any one of Supplementary Notes B8 to B10, wherein the at least one processor is further configured to, after the addition of the secondary cell, receive from the central unit a third message that instructs the distributed unit, or proposes to the distributed unit, to switch a state of the secondary cell among an activated state, a dormant state, and a deactivated state.

(Supplementary Note B12)

The distributed unit according to Supplementary Note B11, wherein the at least one processor is configured to change the state of the secondary cell in accordance with the third message.

(Supplementary Note B13)

The distributed unit according to any one of Supplementary Notes B8 to B12, wherein the first message further contains a second information element instructing the distributed unit, or proposing to the distributed unit, to activate two or more downlink bandwidth parts (BWPs) out of a plurality of downlink BWPs of the secondary cell.

(Supplementary Note B14)

The distributed unit according to any one of Supplementary Notes B8 to B13, wherein the at least one processor is further configured to receive from the central unit a fourth message that instructs the distributed unit, or proposes to the distributed unit, to activate two or more downlink bandwidth parts (BWPs) out of a plurality of downlink BWPs of the secondary cell.

(Supplementary Note B15)

A method performed by a central unit of a base station, the method comprising:
 sending, to a distributed unit of the base station, a first message requesting addition of a secondary cell for carrier aggregation, wherein the first message contains a first information element indicating that the secondary cell needs to be initially activated or dormant.

(Supplementary Note B16)

A method performed by a distributed unit of a base station, the method comprising:
 receiving, from a central unit of the base station, a first message requesting addition of a secondary cell for carrier aggregation, wherein the first message contains a first information element indicating that the secondary cell needs to be initially activated or dormant.

(Supplementary Note B17)

A program for causing a computer to perform a method for a central unit of a base station, wherein the method comprises:
 sending, to a distributed unit of the base station, a first message requesting addition of a secondary cell for carrier aggregation, wherein the first message contains a first information element indicating that the secondary cell needs to be initially activated or dormant.

(Supplementary Note B18)

A program for causing a computer to perform a method for a distributed unit of a base station, wherein the method comprises:
 receiving, from a central unit of the base station, a first message requesting addition of a secondary cell for carrier aggregation, wherein the first message contains a first information element indicating that the secondary cell needs to be initially activated or dormant.

This application is based upon and claims the benefit of priority from Japanese Patent Application No. 2018-207415, filed on Nov. 2, 2018, the disclosure of which is incorporated herein in its entirety by reference.

REFERENCE SIGNS LIST 1 gNB-CU
2 gNB-DU
3 UE
11 gNB-CU-CP
12 gNB-CU-UP
1602 PROCESSOR
1603 MEMORY
1604 MODULES
1704 PROCESSOR
1705 MEMORY
1706 MODULES

What is claimed is:

1. A method performed by a gNB-Distributed Unit (DU), the method comprising:
 receiving a User Equipment (UE) Context Modification Request message from a gNB-Central Unit (CU); and
 sending a UE Context Modification Response message to the gNB-CU in response to receiving the UE Context Modification Request message,
 wherein:
  the UE Context Modification Response message comprises a DU to CU Radio Resource Control (RRC) Information information element (IE),
  the DU to CU RRC Information IE comprises a Cell Group Config IE,
  the Cell Group Config IE comprises a first information element, and
  the Cell Group Config IE comprising the first information element indicates that a secondary cell (SCell) is to be in an activated state.

2. The method according to claim 1, wherein
 the UE Context Modification Request message is a message requesting addition of the SCell, and
 the Cell Group Config IE comprising the first information element indicates that an initial state of the SCell is the activated state.

3. A method performed by a gNB-Distributed Unit (DU), the method comprising:
 receiving a User Equipment (UE) Context Modification Request message from a gNB-Central Unit (CU); and
 sending a UE Context Modification Response message to the gNB-CU in response to receiving the UE Context Modification Request message,
 wherein:
  the UE Context Modification Response message comprises a DU to CU Radio Resource Control (RRC) Information information element (IE),
  the DU to CU RRC Information IE comprises a Cell Group Config IE, and
  the Cell Group Config IE not comprising a first information element indicates that an initial state of a secondary cell (SCell) is a deactivated state.

4. A method performed by a gNB-Central Unit (CU), the method comprising:
 sending a User Equipment (UE) Context Modification Request message to a gNB-Distributed Unit (DU); and
 receiving a UE Context Modification Response message from the gNB-DU after sending the UE Context Modification Request message,
 wherein:
  the UE Context Modification Response message comprises a DU to CU Radio Resource Control (RRC) Information information element (IE),
  the DU to CU RRC Information IE comprises a Cell Group Config IE,
  the Cell Group Config IE comprises a first information element, and
  the Cell Group Config IE comprising the first information element indicates that a secondary cell (SCell) is to be in an activated state.

5. The method according to claim 4, wherein
 the UE Context Modification Request message is a message requesting addition of the SCell, and
 the Cell Group Config IE comprising the first information element indicates that an initial state of the SCell is the activated state.

6. A method performed by a gNB-Central Unit (CU), the method comprising:
 sending a User Equipment (UE) Context Modification Request message to a gNB-Distributed Unit (DU); and
 receiving a UE Context Modification Response message from the gNB-DU after sending the UE Context Modification Request message,
 wherein:
  the UE Context Modification Response message comprises a DU to CU Radio Resource Control (RRC) Information information element (IE),
  the DU to CU RRC Information IE comprises a Cell Group Config IE, and
  the Cell Group Config IE not comprising a first information element indicates that an initial state of a Secondary Cell (SCell) is a deactivated state.

7. A method performed by a gNB that comprises a gNB-Central Unit (CU) and a gNB-Distributed Unit (DU), the method comprising:
 sending by the gNB-CU a User Equipment (UE) Context Modification Request message to the gNB-DU; and
 sending by the gNB-DU a UE Context Modification Response message to the gNB-CU in response to receiving the UE Context Modification Request message,
 wherein:
  the UE Context Modification Response message comprises a Du to CU Radio Resource Control (RRC) Information information element (IE),
  the DU to CU RRC Information IE comprises a Cell group Config IE,
  the Cell Group Config IE comprises a first information element, and
  the Cell Group Config IE comprising the first information element indicates that a secondary cell (SCell) is to be in an activated state.

8. A gNB-Distributed Unit (DU) comprising:
 at least one memory; and
 at least one processor coupled to the at least one memory and configured to:
  receive a User Equipment (UE) Context Modification Request message from a gNB-Central Unit (CU); and
  send a UE Context Modification Response message to the gNB-CU in response to receiving the UE Context Modification Request message,
  wherein:
   the UE Context Modification Response message comprises a DU to CU Radio Resource Control (RRC) Information first information element (IE),
   the DU to CU RRC Information IE comprises a Cell Group Config IE,
   the Cell Group Config IE comprises a first information element, and
   the Cell Group Config IE comprising the first information element indicates that a secondary cell (SCell) is to be in an activated state.

9. The gNB-DU according to claim 8, wherein:
 the UE Context Modification Request message is a message requesting addition of the SCell, and
 the Cell Group Config IE comprising the first information element indicates that an initial state of the SCell is activated state.

10. A gNB-Distributed Unit (DU) comprising:
 at least one memory; and
 at least one processor coupled to the at least one memory and configured to:

receive a User Equipment (UE) Context Modification Request message from a gNB-Central Unit (CU); and send a UE Context Modification Response message to the gNB-CU in response to receiving the UE Context Modification Request message, wherein:
the UE Context Modification Response message comprises a DU to CU Radio Resource Control (RRC) Information information element (IE),
the DU to CU RRC Information IE comprises a Cell Group Config IE, and
the Cell Group Config IE not comprising a first information element indicates that an initial state of a secondary cell (SCell) is a deactivated state.

11. A gNB-Central Unit (CU) comprising:
at least one memory; and
at least one processor coupled to the at least one memory and configured to:
send a User Equipment (UE) Context Modification Request message to a gNB-Distributed Unit (DU); and
receive a UE Context Modification Response message from the gNB-DU after sending the UE Context Modification Request message,
wherein:
the UE Context Modification Response message comprises a DU to CU Radio Resource Control (RRC) Information information element (IE),
the DU to CU RRC Information IE comprises a Cell Group Config IE,
the Cell Group Config IE comprises a first information element, and
the Cell Group Config IE comprising the first information element indicates that a secondary cell (SCell) is to be in an activated state.

12. The gNB-CU according to claim 11, wherein:
the UE Context Modification Request message is a message requesting addition of the SCell, and
the Cell Group Config IE comprising the first information element indicates that an initial state of the SCell is the activated state.

13. A gNB-Central Unit (CU) comprising:
at least one memory; and
at least one processor coupled to the at least one memory and configured to:
send a User Equipment (UE) Context Modification Request message to a gNB-Distributed Unit (DU); and
receive a UE Context Modification Response message from the gNB-DU after sending the UE Context Modification Request message,
wherein:
the UE Context Modification Response message comprises a DU to CU Radio Resource Control (RRC) Information information element (IE),
the DU to CU RRC Information IE comprises a Cell Group Config IE, and
the Cell Group Config IE not comprising a first information element indicates that an initial state of a secondary cell (SCell) is a deactivated state.

* * * * *